(12) United States Patent
Lai et al.

(10) Patent No.: US 9,435,912 B1
(45) Date of Patent: Sep. 6, 2016

(54) ELECTRONICALLY CONDUCTIVE INFRARED TRANSPARENT POLYMER THIN FILMS

(71) Applicant: THE UNITED STATES OF AMERICA AS REPRESENTED BY THE SECRETARY OF THE DEPARTMENT OF THE NAVY, Washington, DC (US)

(72) Inventors: William W. Lai, Ridgecrest, CA (US); Lee R. Cambrea, Ridgecrest, CA (US); Alfred J. Baca, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 595 days.

(21) Appl. No.: 13/678,387

(22) Filed: Nov. 15, 2012

Related U.S. Application Data

(60) Provisional application No. 61/562,145, filed on Nov. 21, 2011.

(51) Int. Cl.
| | | |
|---|---|---|
| *G02B 13/14* | (2006.01) | |
| *G02B 1/04* | (2006.01) | |
| *G02B 5/28* | (2006.01) | |

(52) U.S. Cl.
CPC . *G02B 1/04* (2013.01); *G02B 5/28* (2013.01); *G02B 13/14* (2013.01)

(58) Field of Classification Search
CPC .......... G02B 1/00; G02B 1/04; G02B 1/041; G02B 1/10; G02B 1/105; G02B 1/11; G02B 1/111; G02B 1/113; G02B 1/115; G02B 1/116; G02B 5/208; G02B 5/28; G02B 5/281; G02B 13/14
See application file for complete search history.

(56) References Cited

U.S. PATENT DOCUMENTS

| | | | | |
|---|---|---|---|---|
| 4,945,156 | A * | 7/1990 | Jenekhe et al. | 528/485 |
| 5,248,580 | A * | 9/1993 | Stolka | C08G 73/0677 430/58.8 |
| 5,373,738 | A * | 12/1994 | Abkowitz et al. | 73/335.04 |
| 5,935,723 | A * | 8/1999 | Borden | G02B 1/115 257/E31.117 |
| 6,028,699 | A * | 2/2000 | Fisher | E06B 5/18 359/360 |
| 6,181,468 | B1 * | 1/2001 | Feng et al. | 359/350 |
| 6,399,190 | B1 * | 6/2002 | Myers et al. | 428/335 |
| 8,951,828 | B1 * | 2/2015 | Lai et al. | 438/82 |

* cited by examiner

*Primary Examiner* — Thong Nguyen
(74) *Attorney, Agent, or Firm* — Charlene A. Haley

(57) ABSTRACT

A wholly organic coating consisting of one or more layers of Py-BBL that is transparent in the IR region of the spectrum which is also thermally and oxdatively stable. This is coated onto IR transparent windows, domes and or optical lenses, for enhanced IR and signal filtering.

5 Claims, 3 Drawing Sheets

ELECTRONICALLY CONDUCTIVE INFRARED TRANSPARENT POLYMER THIN FILMS

CROSS-REFERENCE TO RELATED APPLICATIONS

This is a non-provisional application, claiming the benefit of, parent provisional application Ser. No. 61/562,145 filed on Nov. 21, 2011, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to coatings for domes and windows for the selective transmission of infrared signals.

SUMMARY OF THE INVENTION

There is a strong demand for selective coatings. The criteria for these coatings are fairly stringent and must all be met in order for consideration. Because these systems most often work in the infrared (IR) range of the spectrum, the most important criterion is that these coatings be transparent in the IR. Another criterion that is required is a certain level of conductivity. In this disclosure, we will describe work that has done with a series of ladder polymers that not only meet the above two criteria, but is also both thermally and oxidatively stable, which are important for applications that operate at either high altitude or high speeds.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to coatings for domes and windows for the selective transmission of infrared signals. There is a need for high temperature materials that will transmit within a narrow IR bandwidth while excluding non-desirable frequencies. This material meets several criteria that are essential for high performance coatings.

There is a strong demand for selective coatings. The criteria for these coatings are fairly stringent and must all be met in order for consideration. Because these systems most often work in the infrared (IR) range of the spectrum, the most important criterion is that these coatings be transparent in the IR. Another criterion that is required is a certain level of conductivity. In this disclosure, we will describe work that has done with a series of ladder polymers that not only meet the above two criteria, but is also both thermally and oxidatively stable, which are important for applications that operate at either high altitude or high speeds.

Figure 1:
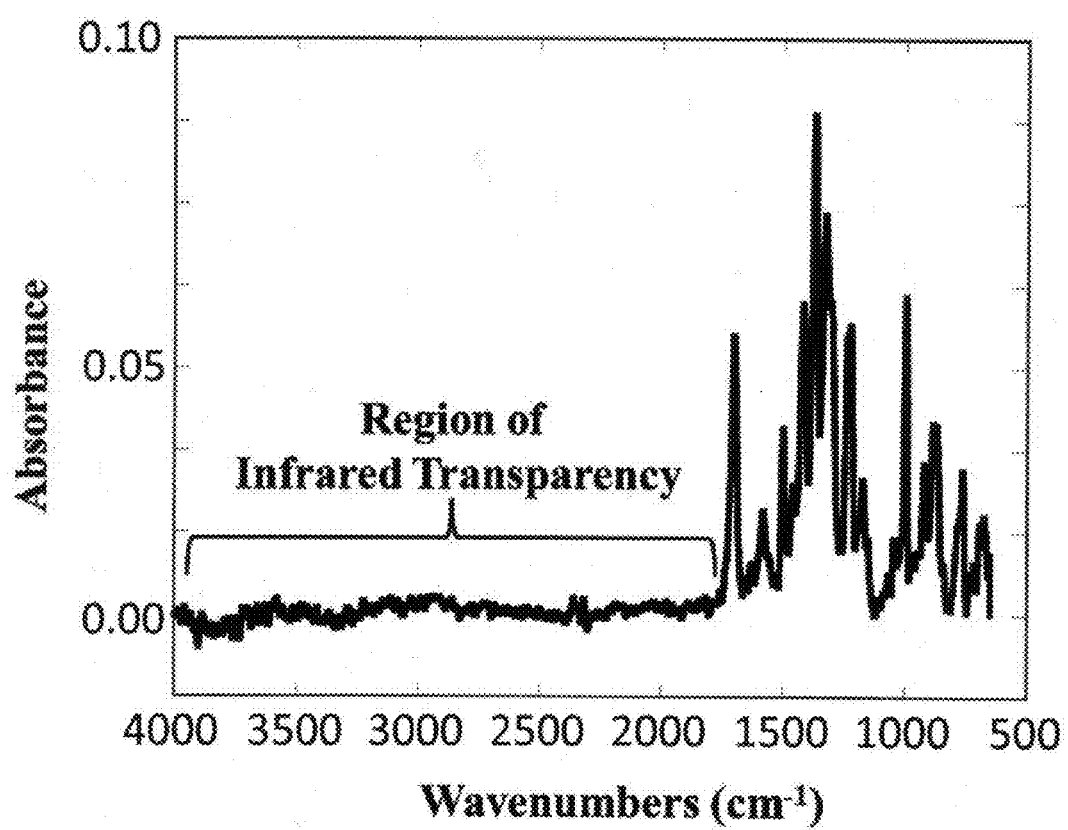
FIG. 1 is a graph illustrating the infrared transparency of Py-BBL, according to embodiments of the invention.
Figure 2:
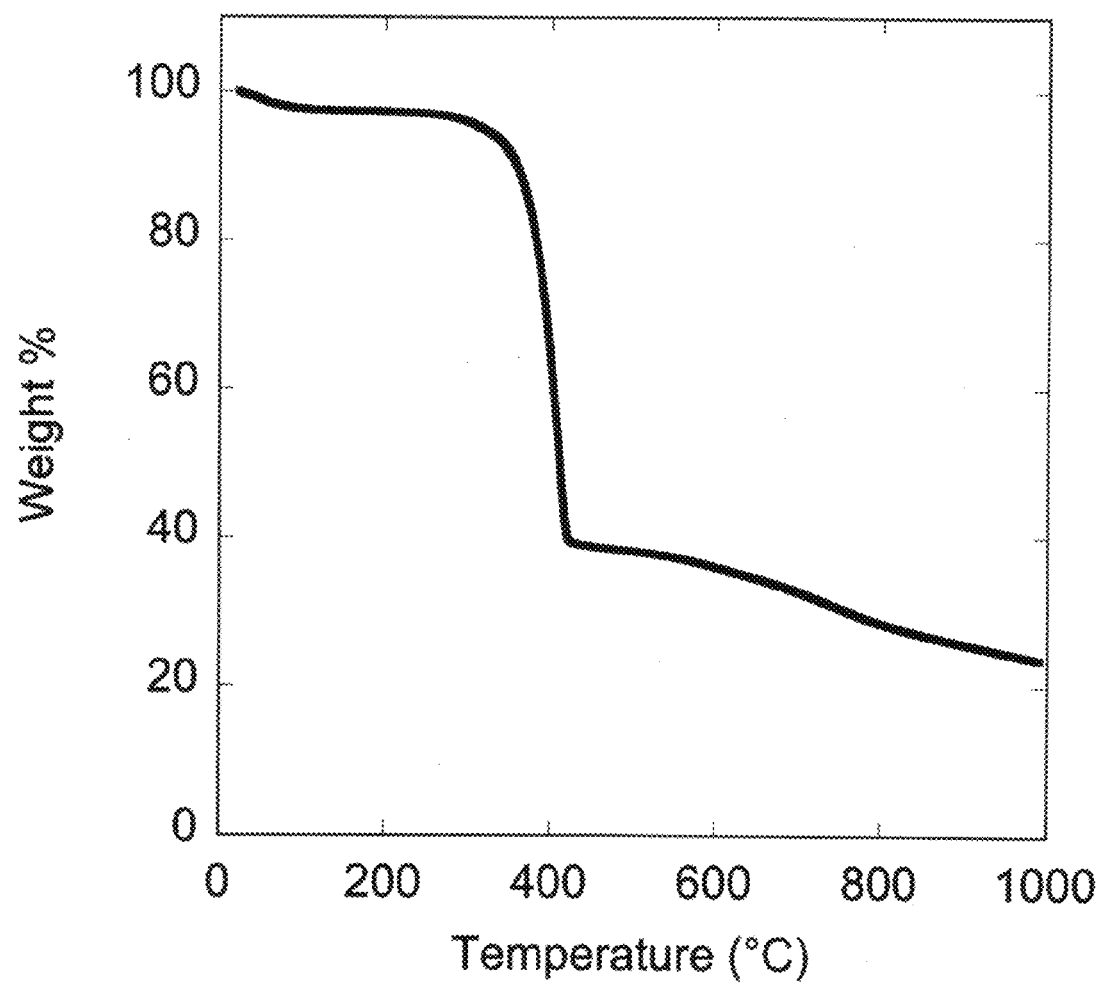
FIG. 2 is a graph illustrating the thermal stability of Py-BBL, according to embodiments of the invention.
Figure 3:
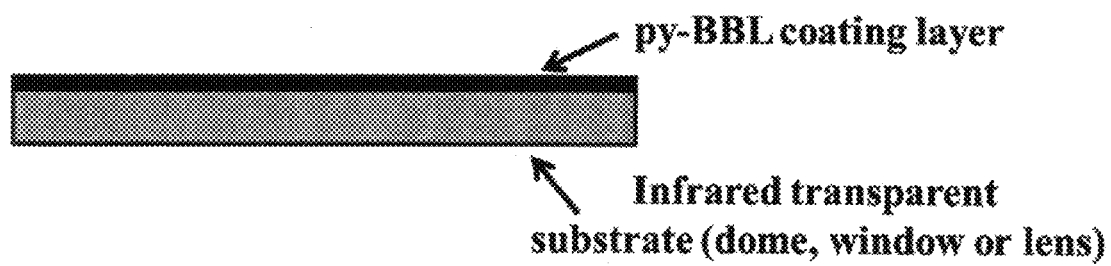
FIG. 3 is a schematic showing the substrate and Py-BBL coating, according to embodiments of the invention.

FIG. 1 is a spectrum of a Py-BBL thin film on a Si wafer. Py-BBL is poly(4-aza-benzimidazo benzophenanthroline). "Py" indicates it is a pyridine derivative. The point of interest is the transparency in the IR region (2-4 microns), which is unexpected for an organic compound, since C—H stretches occur in this range. FIG. 2 is a plot of the weight percent as a function of temperature. Under an inert atmosphere ($N_2$), Py-BBL is thermally stable to 375° C. A significant loss in weight is not seen until 400° C. with a 20% char weight at 1000 C.

Although poly(benzo-isimidazobenzophenanthroline) (BBL) and its derivatives has been known since the late 60 s-70 s, not much has been either in terms of basic research or application until recently.

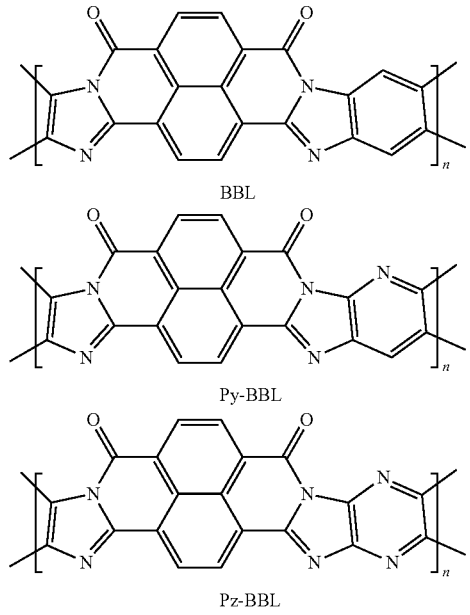

BBL

Py-BBL

Pz-BBL

Within the last decade, BBL has become the subject of several papers detailing its use in electron applications. The highly conjugated nature of the polymer lends extreme thermal and redox stability. Thermal gravimetric analysis (TGA) of BBL under an inert atmosphere gives char yields at greater than 65% at 1000° C., which is rather remarkable for a completely organic system. Its conjugation also imparts fairly high electronic conduction values, on the order of typical semiconductors. Depending on the molecular weights of the polymers, large area free standing thin films, greater than 100 square inches have been made. These films can be made to float in a water trough and used as a decal to apply to substrates of varying size and shapes.

This coating is used to filter out the majority of the energy spectrum while allowing for a wide window of operation in the infrared region, which is where a lot of electronic sensors operate. Current state of the art technology in IR transparent domes and windows coatings consists of metals, but due to their increased density compared to organics are used sparingly (i.e. wire meshes). Since organics are much lower in density than metals, with the same amount by weight, the entirety of the dome or window can be coated, offering increased filtering properties.

We have been able to reliably spin thin films of varying thickness, from sub-microns to several microns thick. We have develop methodologies to process these films of varying thickness that not only completely removes the methanesulfonic acid (MSA), but also maintains the structural integrity of films throughout the processing steps, which is important for application towards large area substrates. The structure of the polymer (shown in attachment) is key to all of the essential properties listed above. One of the key processing results as previously listed is the ability to make large area films, which is fairly common for organic polymers and is often cited as a reason for organic materials. Although this is a very beneficial property common to many organic polymers, most organic polymers are often disqualified as IR coatings because of it being organic. The reason behind this bias is due to the basic nature of organics being some combination of carbon, hydrogen and oxygen. Since the region of interest for IR coatings is in the 2-4 micron range anything with carbon hydrogen stretches are often disqualified as a IR coatings candidate. The structure for BBL, and especially its derivatives is unique in that the percent weight in terms of the hydrogen content is extremely low, around 1%. The low hydrogen content, coupled with the thickness of the films results in the film being transparent in the IR and a viable candidate as a IR coating candidate. Future work will include the evaluation of pyrazine BBL (Pz-BBL) as a candidate for use as an IR coating. Pz-BBL will most likely be more stable towards oxidation and by removing a hydrogen from the tetraamino monomer, there will be a total reduction of hydrogen content by 20% per repeat unit. This could allow or the possibility of thicker films while still being transparent in the IR region of the spectrum.

Embodiments of the invention generally relate to films including, a substrate and at least one layer of pyridine poly(benzo-isimidazobenzophenanthroline) (Py-BBL) having a conductivity between $10^4$ and $10^{-4}$ S/cm, where the layer is associated with the substrate, where the coating is thermally and oxidatively stable and is transparent in the infrared (IR) spectrum.

Another aspect of the invention generally relates to coatings including, at least one or more layer(s) of Py-BBL having a conductivity between $10^4$ and $10^{-4}$ S/cm, S stands for siemens, a unit of conductivity, the reciprocal of resistance, S/cm is Siemens per cm, where the coating is thermally and oxidatively stable and is transparent in the infrared spectrum and is coated onto an infrared transparent substrate.

Another aspect of the invention generally relate to coated IR dome including a dome constructed of a IR transparent substrate and at least one layer of Py-BBL having a conductivity between $10^4$ and $10^{-4}$ S/cm, where the layer is associated with the substrate, where the coating is thermally and oxdatively stable and is transparent in the infrared spectrum.

Another aspect of the invention generally relates to coated windows including, a window constructed of a IR transparent substrate and at least one layer of Py-BBL having a conductivity between $10^4$ and $10^{-4}$ S/cm, where the layer is associated with the substrate, where the coating is thermally and oxdatively stable and is transparent in the infrared spectrum.

Another aspect of the invention generally relates to coated optical lens including, optical lens constructed of an IR transparent substrate and at least one layer of Py-BBL having a conductivity between $10^4$ and $10^{-4}$ S/cm, where the layer is associated with the substrate, where the coating is thermally and oxdatively stable and is transparent in the infrared spectrum. In embodiments, the substrate is selected windows or domes.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An optical shielding device, comprising:
    a non-conductive, infrared transparent substrate; and
    at least one layer of pyridine poly(benzo-isimidazobenzophenanthroline) (Py-BBL) having a conductivity between $10^4$ and $10^{-4}$ Siemens/cm, wherein said at least one layer is associated with said substrate, wherein said at least one layer is a coating and is substantially non-metallic organic, thermally and oxidatively stable, and is transparent from 2-4 microns in an infrared (IR) region of an electromagnetic spectrum, to be utilized as a non-electrical electromagnetic optical shield.

2. The device according to claim 1, wherein said substrate including said coating is selected infrared transparent windows or domes.

3. A coated infrared dome, comprising:
    a dome constructed of an non-conductive infrared (IR) transparent substrate; and
    at least one layer of pyridine poly(benzo-isimidazobenzophenanthroline) (Py-BBL) having a conductivity between $10^4$ and $10^{-4}$ Siemens/cm, wherein said at least one layer is associated with said substrate, wherein said at least one layer is substantially non-metallic organic, thermally and oxidatively stable, and is transparent from 2-4 microns in an infrared region of an electromagnetic spectrum, to be utilized as an electromagnetic infrared dome shield.

4. A coated window, comprising:
    a window constructed of an infrared (IR), non-conductive transparent substrate; and
    at least one layer of pyridine poly(benzo-isimidazobenzophenanthroline) (Py-BBL) having a conductivity between $10^4$ and $10^{-4}$ Siemens/cm, wherein said at least one layer is associated with said substrate, wherein said at least one layer is a coating substantially non-metallic organic, thermally and oxidatively stable, and is transparent from 2-4 microns in an infrared region of an electromagnetic spectrum, to be utilized as an electromagnetic window shield.

5. A coated optical lens, comprising:

optical lens constructed of an infrared (IR) non-conductive transparent substrate; and at least one layer of pyridine poly(benzo-isimidazobenzophenanthroline) (Py-BBL) having a conductivity between $10^4$ and $10^{-4}$ Siemens/cm, wherein said at least one layer is associated with said substrate, wherein said at least one layer is a coating substantially non-metallic organic, thermally and oxidatively stable, and is transparent from 2-4 microns in an infrared region of an electromagnetic spectrum, to be utilized as an electromagnetic shield optical lens.

* * * * *